April 28, 1970     J. L. MacMUNN     3,508,712
FLUID INJECTOR WITH MANIFOLD-FORMING SEALING RING
Filed Oct. 4, 1966
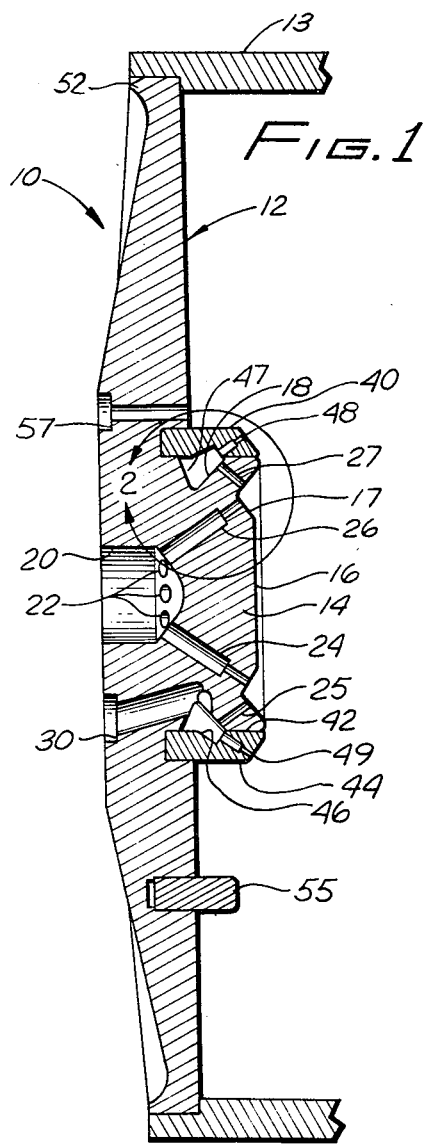
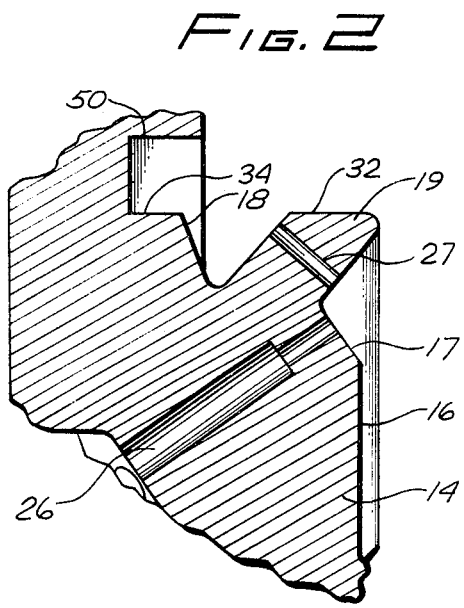
INVENTOR.
JAMES L. Mac MUNN
BY
ATTORNEY

United States Patent Office 3,508,712
Patented Apr. 28, 1970

3,508,712
FLUID INJECTOR WITH MANIFOLD-FORMING SEALING RING
James L. MacMunn, Canoga Park, Calif., assignor to North American Rockwell Corporation, a corporation of Delaware
Filed Oct. 4, 1966, Ser. No. 584,214
Int. Cl. B05b 7/00
U.S. Cl. 239—600                                                4 Claims

ABSTRACT OF THE DISCLOSURE

A fluid injector, particularly a fuel and oxidizer injector for rocket engines having a circular boss containing fluid exit passageways extending from a main body, the boss having an annular peripheral groove, and a ring shrink fitted on a boss peripheral surface outwardly from the annular groove and bridging the groove forming a fluid manifold therewith in communication with the exit passageways.

---

This invention relates to a fuel injector and more specifically to its unique structure and a technique for assembling the injector from two components.

The various types of fuel and oxidizer injectors presently being used in the rocket engine art, particularly, are becoming increasingly expensive in terms of cost and time required for assembly. Assembling procedures are complicated due to the numerous components which must be precisely connected together according to rigid standards. Conventional injectors have their components secured together by welding or brazing techniques, or with expensive high-strength connecting elements. As the number of required connecting elements or weld joints is increased there is a corresponding increase in the risk that one or more is defective. The time consumed by the necessary quality control certification is excessive.

When connecting elements are employed, potential leakage paths always exist. Pressure surges occurring in injectors at unpredictable times operate to rupture joints formed by welding or brazing. As a result, an injector ring or other component can be "blown off" causing disastrous results. These components that are prone to being "blown off," due to machining difficulties, are customarily assembled on the backface (opposite the injector face) so that harmful effects are caused outside of the combustion chamber. In such a case, the vehicle itself or the device incorporating the injector can become severely damaged or demolished. In addition, once components in conventional injectors are "blown off" or otherwise ruptured, the condition is irreparable.

The foregoing disadvantages of conventional injectors are avoided by the instant invention which can be used to quickly and inexpensively assemble an injector having only two components. Neither welding nor brazing techniques nor connecting elements of any kind are used in assembling the injector, thus minimizing costs as well as risk of defects.

Briefly described, the instant invention comprehends a unique injector having only two components which are assembled by a shrink-fitting technique. The two components are a main body integrally formed with a manifolded circular-shaped or boss portion extending therefrom and a ring. When the two components are at ambient or the same temperature, the inner diameter of the ring is smaller than the outer diameter of the boss portion. Prior to assembling the components, the ring is heated until its inner diameter expands to exceed the outer diameter of the boss portion, at which time the ring is positioned onto the boss portion. The ring is then shrunk by cooling causing the two components to become tightly sealed together. In order to eliminate excessive weight and still provide the necessary sealing surface between the two components, a circular recess is formed in the main body to receive one end of the ring.

An object of this invention is to provide an injector and a technique for assembling a two-component injector requiring no welds or connecting elements.

Other objects and advantages of the instant invention will be clearly understood when the following detailed description is studied in conjunction with the detailed drawings in which:

FIG. 1 is a cross-sectional side view of the injector with the main body and manifold ring components completely assembled.

FIG. 2 is an enlarged cross-sectional view of that portion of the main body encircled by line 2 as shown in FIG. 1.

An embodiment of a fuel injector assembled according to the instant invention is shown in FIG. 1. An injector assembly 10 is depicted which is to be used for supplying fuel to a thrust chamber assembly 13 (shown in part only). Injector 10 may be used with any suitable type of heat engine such as a diesel engine, or a rocket motor or the like. For purposes of clarification, the assembling and construction of injector assembly 10 will be explained in terms of its use with a rocket motor (not shown). A circular disc-shaped main body 12 is formed with a raised circular-shaped boss 14 which, when injector assembly 10 is actually being used, extends forwardly so as to project slightly into the rocket motor combustion chamber (not shown). One surface of boss 14 constitutes part of an injector face 16 formed with an annular bevel groove 17. A side wall portion 19 of boss 14 is formed with an annular groove 18 whose function is described below. Formed in the center of main body 12 is an inlet 20 through which propellant, such as oxidizer, is supplied. A plurality of ports 22 are formed in the bottom wall defining inlet 20. Extending between ports 22 and bevel groove 17 are a series of divergent drill holes, such as 24 and 26, through which oxidizer is supplied to the combustion chamber.

Positioned in tight sealing relationship on boss 14 is a manifold ring 40 having an inner wall 42 and an outer wall 44. Formed on inner wall 42 is a bevel shaped annular groove 46 facing annular groove 18 which grooves together define a manifold chamber 47. Main body 12 is fabricated with a fuel inlet 30 that is in communication with chamber 47. Extending between chamber 47 and bevel groove 17 is a series of convergent drilled holes such as 25 and 27. In a similar manner, extending between chamber 47 and outer wall 44 of ring 40 is a series of divergent drill holes such as 48 and 49. Fuel supplied through inlet 30 is conducted through manifold chamber 47 and is then expelled through openings 25, 27, 48 and 49 into the combustion chamber.

Injector assembly 10 is designed to service a bipropellant system, although injectors machined to service monopropellant systems could also be made in accordance with the instant invention. The series of holes represented by holes 48 and 49 are boundary layer coolant orifices through which fuel is sprayed, for cooling purposes, onto the interior surface of the combustion chamber. This cooling result could be achieved without any holes in manifold ring 40 by various other cooling systems such as one of the many well-known regenerative cooling arrangements. The streams of propellant issuing from the adjacent holes 26 and 27, which together constitute a doublet, impinge with one another and become atomized and mixed. Together with similar impinging propellant streams, a predetermined resultant spray fan is developed which is fed into the combustion chamber.

Referring to FIG. 2, main body 12 is formed with an annular recess 50 for receiving one end of manifold ring 40 as shown in FIG. 1. Side wall 19 includes an outer sealing surface 32 and an inner sealing surface 34. If recess 50 were not present, then in order to provide the necessary predetermined sealing surface, boss 14 would project further into the combustion chamber with the adverse result that additional space would be occupied and there would be a weight increase. Recess 50 can be of sufficient depth so that boss 14 rather than being raised from injector face 16 is flush with it.

Mounted in main body 12 and offset from boss 14 is a locating pin 55 which is used to properly index injector assembly 10 to the combustion chamber. Port 57 is used for sensing the combustion chamber pressure. The outer periphery of main body 12 constituting a flange 52 may be secured by any suitable means such as welding or bolting to the combustion chamber.

Before manifold ring 40 and main body 12 are assembled as a unit to constitute injector assembly 10, each is fabricated by machining. Drilling the various propellant supply holes can be postponed until after manifold ring 40 and main body 12 are assembled. The components can be fabricated from 321 Cres stainless steel, 6061 T–6 aluminum alloy, or any other standard metal suitable for making injectors. When 321 Cres stainless steel is used in fabricating both ring 40 and main body 12 and injector 10 is to be used for developing 100 pounds thrust, then the diameter of boss 14 will be approximately one inch. The thrusting unit could be for attitude control or maneuvering of a space vehicle. At room temperature, before assembly, the outer diameter of boss 14 exceeds the inner diameter of ring 40 by a distance in the order of 0.002 to 0.004 inch. Ring 40 is then heated to between 900 and 1000° F. in which temperature range the inner diameter of ring 40 will be enlarged sufficiently to exceed the outer diameter of boss 14. Preferably, the heating is achieved by an induction heating procedure in which an electrical coil is wrapped around the ring and is removed when the desired temperature is attained.

Ring 40 is then accurately positioned on boss 14 making an interference fit with it in the order of from 0.002 to 0.004 inch, main body 12 being maintained at room temperature or at least at a temperature much cooler than that of ring 40. With the components held in the desired relationship, ring 40 is shrunk, preferably by cooling with a suitable gas such as air. A tight shrink fit is then achieved between boss 14 and ring 40. At this point injector assembly 10 has been self-sealed and all potential leakage paths have been blocked.

The sealing surface constituted by surfaces 32 and 34 of side wall 19 and inner wall 42 of ring 40 become tightly clamped together sufficient to withstand anticipated pressures. Under these conditions the sealing surfaces are held together with 15,000 p.s.i. and the normal pressure of the fluid to be injected is 300 p.s.i.

Although the sealing pressure for injector 10 is designed with a high safety factor, it is well known that unexpected high pressure surges are likely to occur in injectors and like constructions. The force generated by a pressure surge is often adequate to "blow off" a plug or other component such as a ring, like manifold ring 40. In conventional injectors when a ring is blown off there is an accompanying permanent destruction of the high strength connecting elements or permanent rupturing of a brazed or welded joint. When this occurs, propellant will flow through the resulting leakage paths causing at least great combustion instability and very possibly even more disastrous consequences. Once the leak path is developed, it cannot be closed and the potentially dangerous situation cannot therefore be repaired.

According to the instant invention, injector 10, under some circumstances, is self-correcting; i.e., it is capable of curing potential dangers posed by developing leakage passages. For example, when a great pressure surge separates part of ring 40 from boss 14, propellant will flow through the resulting clearances causing combustion instability. However, as long as the elastic limit of the material from which ring 40 is constructed is not exceeded then ring 40 will not experience permanent deformation. After the surging condition has elapsed, ring 40, due to the elastic memory of the material, will contract to its original position and once again become tightly seated on boss 14. Thus, the original sealing pressure will be restored and normal flow from injector 10 will continue. It should be noted therefore that leakage passages developed due to excessive pressure surges, as long as the burst pressure or elastic limit pressure is not attained will only create temporary irregular flow.

Another advantageous feature of the instant invention is that injector 10 is internally manifolded; i.e., the manifolding faces the combustion chamber so that if the burst pressure of injector 10 is exceeded, all damage is confined to the combustion chamber. The leakage passages would all be formed on the injector face 16 side of injector 10 so that the uncontrolled and erratic propellant discharge would be fed into the combustion chamber. Therefore, if failure is to occur at all it is at least confined to disrupting combustion in or destroying the combustion chamber. In contrast, due to burdensome machining problems, most conventional injectors are externally manifolded; i.e., manifolded on the back face of the injector (the side not facing the combustion chamber) so that propellant can spray into the space vehicle itself or the like causing more expensive damage and perhaps complete destruction. Due to the fact that injector 10 is internally manifolded there is no potential leak passage to locations outside of the combustion chamber.

Conventional injectors require a great deal of time for inspection procedures and quality control certification. Injector 10 can be quickly and accurately certified first by a dimensional inspection to assure that the correct space differential between boss 14 and ring 40 exists, and secondly, by a standard hydrostatic test to assure that ring 40 is adequately sealed and that ring 40 will withstand the design pressures. Much time is saved during inspection and certification because injector 10 has no connectors or welded or brazed joints.

The foregoing specific embodiments and descriptions of the instant invention are intended only to illustrate and not narrow the underlying invention, the scope and spirit of the invention being expressed in the following claims.

I claim:

1. A fluid injector comprising:
   a main body having a circular-shaped boss portion outstanding forwardly from the plane of said main body, the outer end of said boss including an outer sealing surface extending continuously around the boss perimeter, the main body being formed with at least one rearwardly facing inlet and the circular-shaped portion being formed with a continuous annular groove around its periphery in communication with said inlet,
   a ring shrink-fitted on said outer surface of the circular-shaped boss portion outwardly of said annular groove in tight sealing relationship to obviate formation of leak paths and bridging said annular groove to form an annular manifold therewith, and
   means defining a series of fluid exit holes extending directly from the annular manifold to the exterior of the circular-shaped boss portion through a solid section of the boss portion radially inward of said outer surface.

2. The structure according to claim 1 wherein the ring is provided with divergent fluid passageways to conduct fluid onto an interior wall of a combustion chamber for cooling purposes.

3. The structure according to claim 1 wherein said fluid exit holes have convergent exits on the front face of said boss portion and further including a series of divergent openings extending from a second inlet in said main body through the circular-shaped boss portion terminating radially inwardly from the convergent exits, so that fluid streams passing through the respective exits and openings will impinge.

4. A fluid injector comprising:
  a main body having a circular-shaped boss portion outstanding forwardly from the plane of said main body, the main body being formed with at least one rearwardly facing inlet and the circular-shaped portion being formed with an annular groove around its periphery in communication with said inlet,
  a ring fitted on an outer surface of the circular-shaped boss portion outwardly of said annular groove in tight sealing relationship and bridging said annular groove to form an annular manifold therewith,
  means defining a series of fluid exit passageways between the annular manifold and the exterior of the circular-shaped boss portion through a solid section of the boss portion radially inward of said outer surface, and
  means in the main body annularly surrounding the circular-shaped boss portion and inwardly therefrom defining a recess into which one end of the ring is inserted inwardly of said annular groove and wherein said ring is shrink-fitted on said boss outer surface to obviate formation of leak paths.

References Cited

UNITED STATES PATENTS

| | | | |
|---|---|---|---|
| 2,462,704 | 2/1949 | Zink | 239—543 |
| 3,074,231 | 1/1963 | Klein | 239—543 |
| 3,107,060 | 10/1963 | Coursey | 239—543 |
| 3,137,445 | 6/1964 | Hirschfeld et al. | 239—431 |

EVERETT W. KIRBY, Primary Examiner

U.S. Cl. X.R.

239—290, 434.5